(12) United States Patent
Maschio et al.

(10) Patent No.: US 12,740,506 B2
(45) Date of Patent: Sep. 22, 2026

(54) RAISED WALL FOR HOPPERS, IN PARTICULAR FOR FERTILIZER SPREADING MACHINES AND HOPPER OBTAINED IN THIS MANNER

(71) Applicant: Maschio Gaspardo S.p.A., Campodarsego (IT)

(72) Inventors: Andrea Maschio, Morsano al Tagliamento (IT); Stefano Zaramella, Campo San Martino (IT)

(73) Assignee: Maschio Gaspardo S.p.A., Campodarsego (IT)

( * ) Notice: Subject to any disclaimer, the term of this patent is extended or adjusted under 35 U.S.C. 154(b) by 531 days.

(21) Appl. No.: 18/282,272

(22) PCT Filed: Mar. 15, 2022

(86) PCT No.: PCT/IB2022/052319
§ 371 (c)(1),
(2) Date: Sep. 15, 2023

(87) PCT Pub. No.: WO2022/195471
PCT Pub. Date: Sep. 22, 2022

(65) Prior Publication Data

US 2024/0155968 A1 May 16, 2024

(30) Foreign Application Priority Data

Mar. 17, 2021 (IT) ........................ 102021000006416

(51) Int. Cl.
*A01C 15/00* (2006.01)
*B65D 88/00* (2006.01)
(Continued)

(52) U.S. Cl.
CPC .......... *A01C 15/006* (2013.01); *A01C 15/005* (2013.01); *B65D 88/005* (2013.01); *A01D 41/1226* (2013.01); *A01F 12/60* (2013.01)

(58) Field of Classification Search
CPC .. A01C 15/006; A01C 15/005; B65D 88/005; A01D 41/1226; A01F 12/60
See application file for complete search history.

(56) References Cited

U.S. PATENT DOCUMENTS 1,398,852 A * 11/1921 Gilbert ................ A63H 33/102 24/339
1,663,574 A * 3/1928 Venable ................ G01G 21/00 222/129

(Continued)

FOREIGN PATENT DOCUMENTS

DE 10359179 A1 * 7/2005 ........... A01C 17/001
DE 102014004481 B4 * 3/2022 ............ A01D 90/10

(Continued)

*Primary Examiner* — Arpad Fabian-Kovacs
(74) *Attorney, Agent, or Firm* — Stradley Ronon Stevens & Young, LLP

(57) ABSTRACT

A raised wall for hoppers. The wall has one panel with opposing ends arranged for connection to corresponding ends of an adjacent panel. The wall further has a seal applied between adjacent panels at a connection. The panel comprises a plugging surface with longitudinal edges configured to be joined in a superimposed manner on an adjacent edge. The longitudinal edges are interrupted in the region of the connection of the seal where the panel is continued by the single plugging surface. The seal comprises a first surface which abuts the plugging surface from the hopper exterior, a second surface which abuts the plugging surface from the hopper interior, and a bridge between the two surfaces delimiting a channel which receives the plugging surface of at least one of the adjacent panels for covering and blocking the gap generated by the interruption of the edges.

20 Claims, 5 Drawing Sheets

(51) Int. Cl.
*A01D 41/12* (2006.01)
*A01F 12/60* (2006.01)

(56) References Cited

U.S. PATENT DOCUMENTS 2,284,458 A * 5/1942 Antwerp ................ G09B 25/04 217/69
3,432,064 A * 3/1969 Ten ...................... A01C 15/006 220/531
3,883,005 A * 5/1975 Stevens ................ B65D 88/005 280/30
3,955,510 A * 5/1976 Kinik ................. A47B 47/0033 403/171
4,460,214 A * 7/1984 Kuhns .................. A01C 15/006 296/33
4,493,425 A * 1/1985 Yoshida ............. A47B 47/0033 211/186
4,700,640 A * 10/1987 Andersson ........... A01C 15/006 220/531
4,723,679 A * 2/1988 Sinchok ............... B65D 21/083 220/4.03
4,735,330 A * 4/1988 Hoss .................. B65D 21/0215 220/6
4,779,751 A * 10/1988 Munroe ............. B65D 21/0215 217/69
4,960,300 A * 10/1990 Burvee .................. B62D 33/08 296/34
4,966,310 A * 10/1990 Hawkins ................ B65D 88/54 222/394
4,969,568 A * 11/1990 Yoshida ............... B43M 99/008 211/186
5,224,635 A * 7/1993 Wise ..................... B62B 5/0083 206/508
5,322,213 A * 6/1994 Carter .................... B65D 5/448 229/199
5,452,847 A * 9/1995 Harris .................. B65D 21/064 16/373
5,531,352 A * 7/1996 Kraft ...................... B65D 19/38 220/675
5,556,338 A * 9/1996 Covington ........... A01D 46/082 460/119
6,126,220 A * 10/2000 Brasher .................. B62D 33/08 296/26.05
6,206,779 B1 * 3/2001 Gerber ............... A01D 41/1226 56/28
7,918,720 B2 * 4/2011 Mohr ................... B65D 88/005 460/119
7,922,001 B2 * 4/2011 Meers .................. B65D 21/045 206/505
8,146,974 B2 * 4/2012 Horst ................. A01D 41/1226 460/119
8,944,898 B2 * 2/2015 Barnes ............... A01D 41/1226 460/119
9,901,030 B2 * 2/2018 Matousek .......... A01D 41/1208
10,155,550 B2 * 12/2018 Claerhout .............. B62D 33/08
11,136,183 B2 * 10/2021 Ota ...................... B65D 21/066
2005/0284922 A1 * 12/2005 Feltz ...................... B65D 5/029 229/185
2010/0072199 A1 * 3/2010 Manuel .................. B65D 19/18 220/4.33
2011/0095554 A1 * 4/2011 Zeuner ............... A01D 41/1226 296/15
2012/0205369 A1 * 8/2012 Nolan .................... B65D 19/18 220/4.31
2014/0274235 A1 * 9/2014 Claerhout .......... A01D 41/1208 460/59
2020/0298261 A1 * 9/2020 Mäenpää .............. B05B 13/005

FOREIGN PATENT DOCUMENTS

EP 0982191 A1 * 3/2000 ........... A01C 15/006
EP 1634815 A1 * 3/2006 ........... B65D 21/045
EP 1820383 A1 * 8/2007 ........... A01C 15/006
WO WO-2016108196 A1 * 7/2016 ............. A01C 17/00

* cited by examiner 1
2
3
4
5
6
7
7a
7b
8
9
10
12
13
14

1
2
3
4
5
6
7
7b
9
13
14
17

15
18
31
30
21
16
19
22
20
13

22
18
17
40
15
X
X
22
19
20
21
30
16

21
19
17
40
22
18
20

RAISED WALL FOR HOPPERS, IN PARTICULAR FOR FERTILIZER SPREADING MACHINES AND HOPPER OBTAINED IN THIS MANNER

RELATED APPLICATIONS

The present application is a U.S. national phase application of International Application No. PCT/IB2022/052319 filed on Mar. 15, 2022, which claims the benefit of priority to Italian Patent Application No. 102021000006416, filed on Mar. 17, 2021, the contents of which are incorporated in this application by reference.

TECHNICAL FIELD

The present invention relates to a raised wall for hoppers, in particular for fertilizer spreading machines.

TECHNICAL BACKGROUND

The term "fertilizer spreaders" in the following context is intended to be understood to include machines for the broad distribution of granular material which is generally obtained by the effect of a centrifugal-type distributor, for example, machines for scattering granular chemical products, such as fertilizers, salt spreading machines, sowers and the like. The raised wall of this invention is preferably used in such machines, but is configured to be used in hoppers which are also intended for other purposes.

Fertilizer spreaders can be configured with hoppers with capacities which are different in accordance with the requirements of the user. In order to obtain machines with different capacities, it is possible to construct different hoppers to be combined from time to time with the single basic machine or it is possible to take a basic hopper as a basis and to subsequently add raised portions (raised walls) in order to achieve the total desired capacity.

It is very important for the hopper, however it is constructed, to be substantially sealed, that is to say, not to have openings or discontinuities from which the material to be distributed can be discharged, becoming scattered over the environment. This is because this can cause both environmental damage and a useless waste of expensive product.

In order to overcome these disadvantages, a known technique is to construct entire hoppers of various sizes which are obtained by welding the panels which constitute them to each other. Such a methodology involves a large number of disadvantages, however, because it is necessary to know well in advance the configuration selected by the client, it is necessary to have available hoppers with different capacities and it further involves higher costs for the economic expenditure, transport and storage of the hoppers which are constructed in this manner.

The most flexible solution for obtaining hoppers with different capacities is instead to construct a basic hopper, the capacity of which can be enlarged by raised walls which are joined to each other and to the basic hopper, for example, by bolted fasteners. In this case, however, the inevitable tolerances and technical limitations during the preparation of the metal sheets which are constructed with the normal bending techniques lead to the inevitable formation of small openings from which the product to be distributed can be discharged, in particular at the edges of the hopper.

One solution for overcoming the problem is to seal the junctions with silicone. This solution is least appreciated, however, both in terms of aesthetic effect and in terms of durability. The silicone over time becomes dirty, changes color but particularly becomes detached.

Another known solution is to use corner pieces made from plastic material. In this case, the entire edge of the hopper or the raised wall is constructed from plastic material. The component made from plastic material becomes a structural element of the hopper which, over time, can break as a result of the phenomena of aging of the plastic material. Furthermore, it involves high costs of investment for constructing the molds.

There is also provision for constructing sides and corner pieces of the hopper by molding in a single piece from sheet metal. In this case, the investment costs are also very high but can be reduced by constructing sides and corner pieces from sheet metal which are subsequently joined by welding. Even this solution is disadvantageous, however, as a result of some aspects connected particularly with the manpower necessary for taking up the components and the potential grinding of the welds.

An example of a hopper is described in European Patent No. EP 1820383.

SUMMARY OF THE INVENTION

The invention involves this technical context. The main problem confronted by the invention is to provide a raised wall for hoppers which is structurally and functionally configured to overcome at least some of the defects set out above with reference to the conventional solutions. It is further preferable for the hopper to be able to be assembled at any time, including after delivery to the client, and for it to be able to be modified in terms of capacity and dimensions even at times after the original construction thereof.

This problem is solved according to the invention by a raised wall for hoppers, particularly though not exclusively conceived to be used in fertilizer spreading machines, and constructed according to the following disclosure.

According to an embodiment, the raised wall comprises at least one panel with at least a first end and a second end which are arranged for mutual connection to corresponding ends of at least one adjacent panel and a seal which is provided to be applied between adjacent panels in the region of the connection zone.

There is defined in a panel suitable for constructing the raised wall a plugging surface which is provided with identically orientated longitudinal edges which are configured to be joined in a superimposed manner on an adjacent edge.

Therefore, it will be appreciated that, preferably, the longitudinal edges perform the function of flanges. The longitudinal edges are preferably interrupted in the region of the connection of the seal where the panel is continued by the single plugging surface. The seal preferably comprises a first surface which is intended to be in abutment with the plugging surface from the exterior of the hopper, a second surface which is intended to be in abutment with the plugging surface from the interior of the hopper, a bridge between the first surface and second surface delimiting a channel between the surfaces in which there is received the plugging surface of adjacent panels for covering and blocking the gap generated by the interruption of the edges.

In a preferred embodiment, the seal has an angular shape.

According to one embodiment, the channel is shaped to receive four plugging surfaces of four corresponding adjacent panels, both longitudinally and in a superimposed state.

It is preferable for the first surface to have a greater extent than the second surface so as to overhang with respect to the projection thereof in the plane of the first surface and to overhang beyond the gap generated by the interruption of the edges. There is thereby obtained both a correct anchoring of the seal to the panels of the raised wall and a correct seal in the region of the gap.

Advantageously, the channel comprises a portion including a superimposition zone, in which the channel has double the width with respect to that of another portion of the channel in such a manner that the superimposition zone can receive two superimposed plugging surfaces and the other portion can receive a single one of the plugging surfaces. There is thereby constructed a solid junction between adjacent panels by superimposing the ends in the region of the corners.

Preferably, the first surface has an inflected course in the region of the end of the superimposition zone. This allows the first surface to return in a manner tight against the corresponding panel just beyond the superimposition zone.

The seal is made from plastic material or rubber or other material which is sufficiently resilient and which withstands corrosive phenomena.

The first surface of the seal in the region of the inflected course is shaped so as to return in a manner tight against the corresponding plugging surface with a terminal portion thereof which extends so as to cover from the exterior a portion of the plugging surfaces, in which the edge is still present.

A hopper with variable capacity in accordance with the contingent requirements can thereby be constructed by assembling on a hopper base at least one raised wall ring which is constructed with raised walls constructed according to one or more of the preceding features.

It is to be understood that both the foregoing general description and the following detailed description are exemplary, but are not restrictive, of the disclosure.

BRIEF DESCRIPTION OF THE DRAWINGS

The features and advantages of the invention will be better understood from the following detailed description of a preferred embodiment which is illustrated by way of non-limiting example with reference to the appended drawings, in which.

DETAILED DESCRIPTION OF A PREFERRED EMBODIMENT OF THE INVENTION

Figure 1:
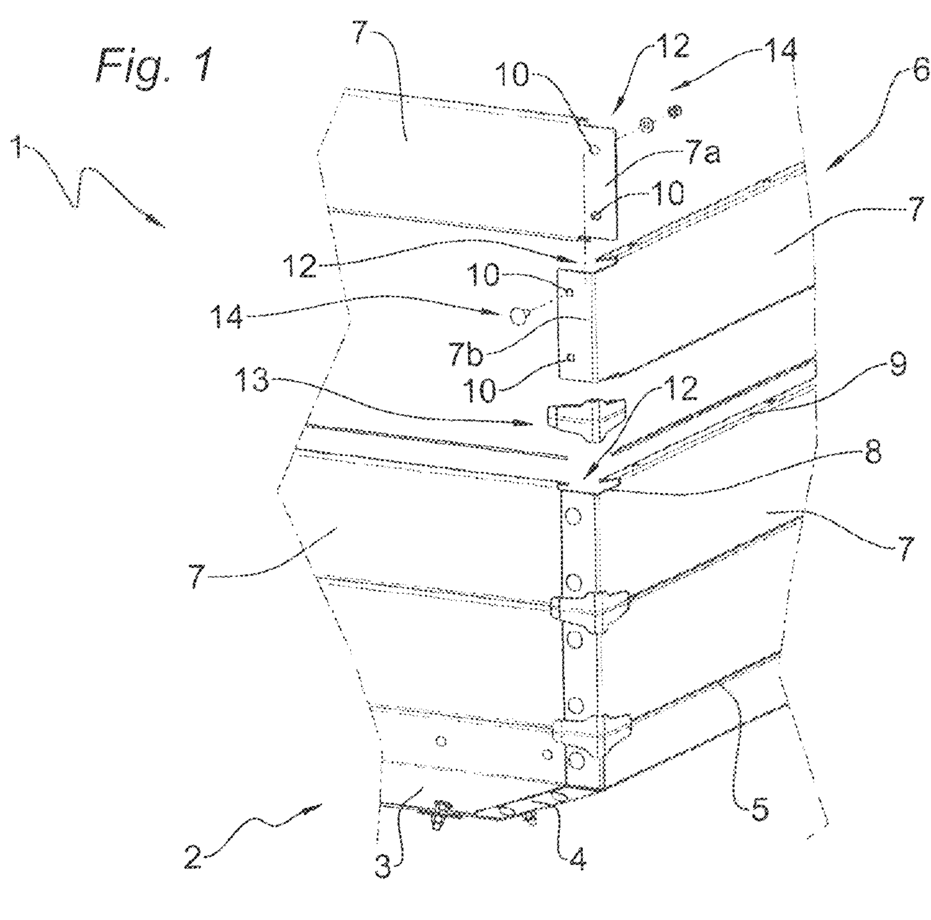
FIG. 1 is a partial perspective view of a hopper with raised walls constructed according to the present invention.

In the Figures, there is generally designated a hopper 1 with a variable volume for a fertilizer spreading machine which is not illustrated. The hopper 1 comprises a hopper base 2, for example, with a frusto-pyramidal shape or frustoconical shape which tapers towards the bottom and which is formed by panels 3 which are joined by angular profiles 4 and which are terminated towards the upper portion (or at the side with the greater extent) with a peripheral edge 5 with a relief which is folded in an L-shaped manner towards the interior of the hopper 1 so as to constitute an end wall thereof. As will be better illustrated below, one or more raised wall rings 6 are positioned and fixed on the peripheral edge 5.

The raised wall rings 6 are constructed by assembling a plurality of panels 7, one for each hopper side. In the exemplary configuration, this involves a hopper with a quadrangular outline and therefore each ring is composed of four panels 7 with a main longitudinal extent, each one having respective longitudinally opposite ends 7*a*, 7*b* which are provided for mutual connection with corresponding ends 7*b*, 7*a* of at least one adjacent panel 7.

The panels 7 have a plugging surface 8 which is provided with longitudinal edges 9 which preferably run along the two greater sides and which are preferably obtained by bending the sheet metal of the plugging surface 8 in an identically orientated manner at right angles. The term "edge" is therefore preferably intended to refer to the shaping of the sheet metal edges.

Figure 2:
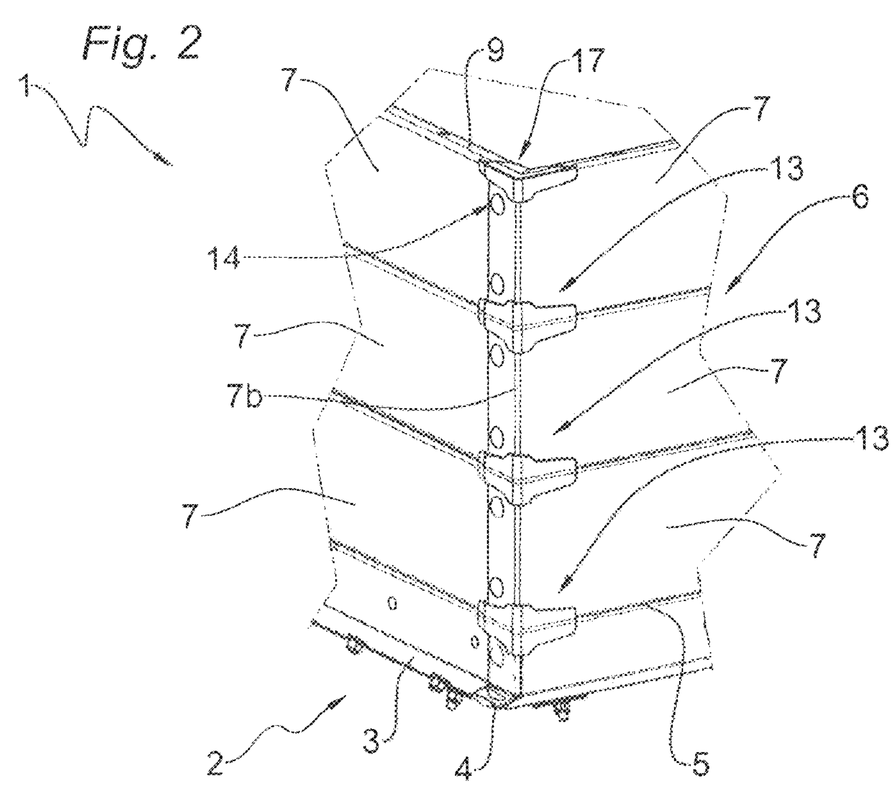
FIG. 2 is a partial perspective view of the hopper of FIG. 1 in an assembled condition.
Figures 3, 4:
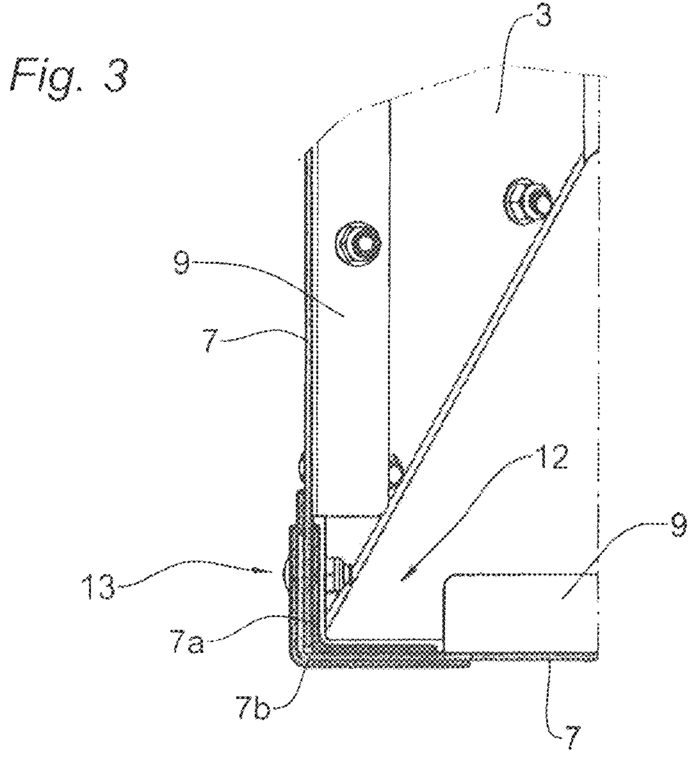
FIG. 3 is a plan view of a detail of the hopper shown in FIGS. 1 and 2.
FIG. 4 is a perspective view of a detail of the raised wall according to the invention.
Figure 5:
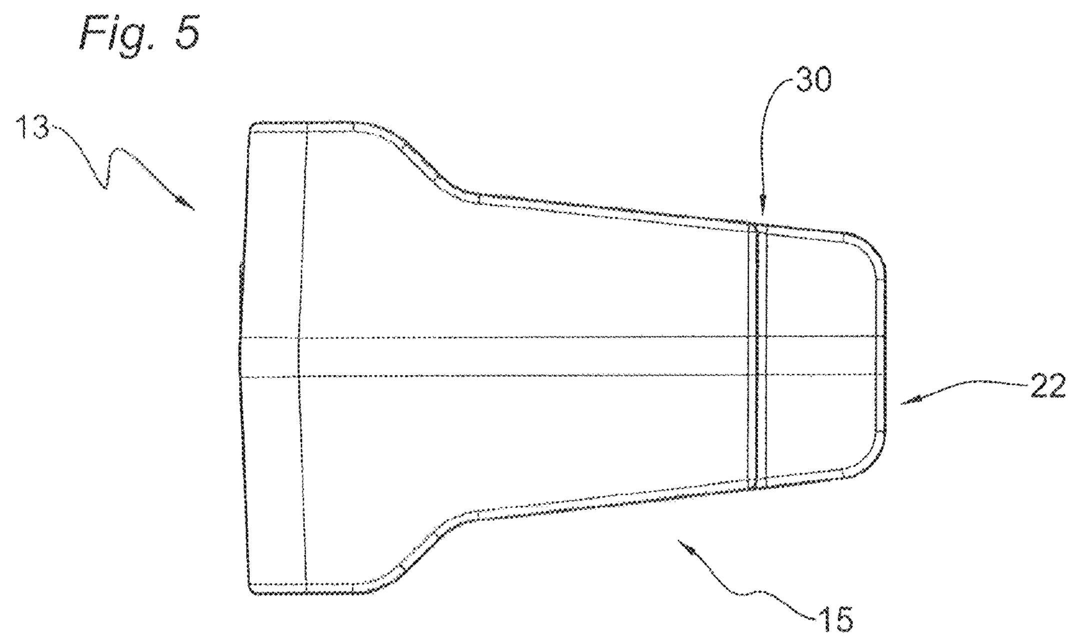
FIG. 5 is a front view of the raised wall shown in FIG. 4.
Figure 6:
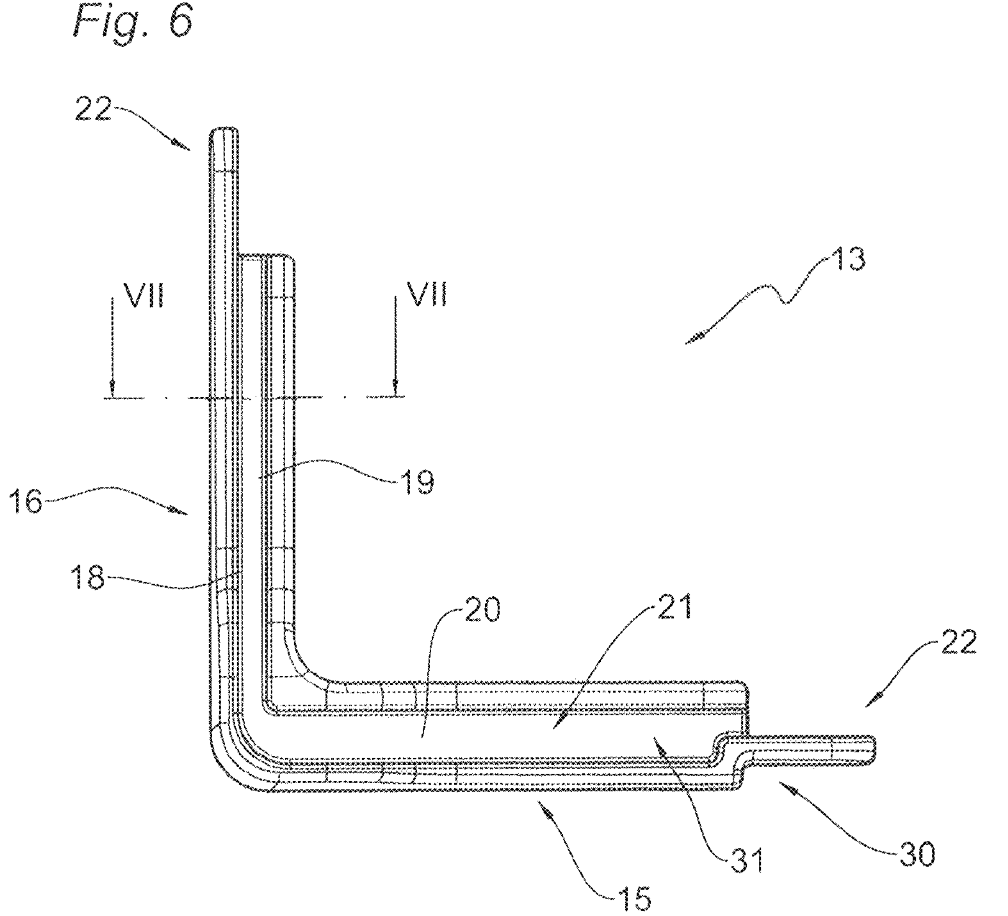
FIG. 6 is a plan view from above of the raised wall shown in FIGS. 4 and 5.
Figure 7:
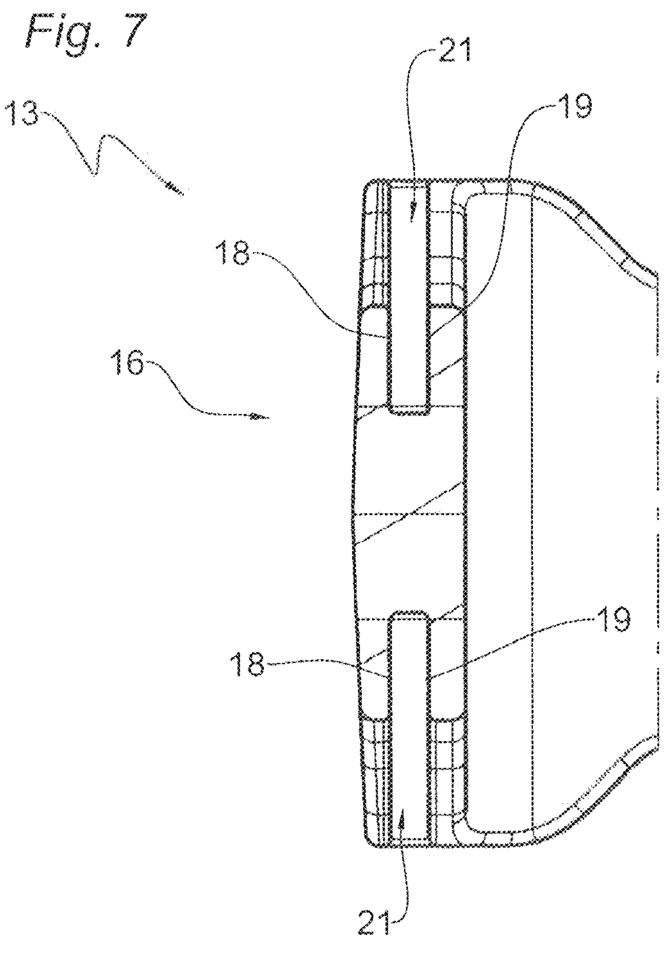
FIG. 7 is a cross-section along the line VII-VII of FIG. 6 of the raised wall.
Figure 8:
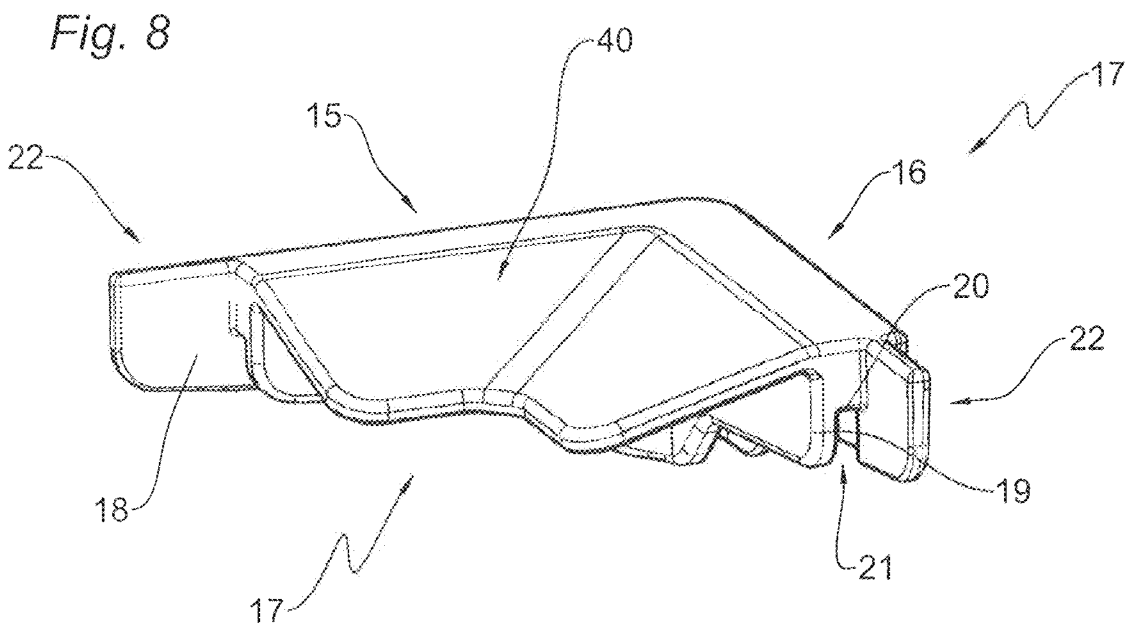
FIG. 8 is a perspective view of another detail of the raised wall according to the invention.
Figure 9:
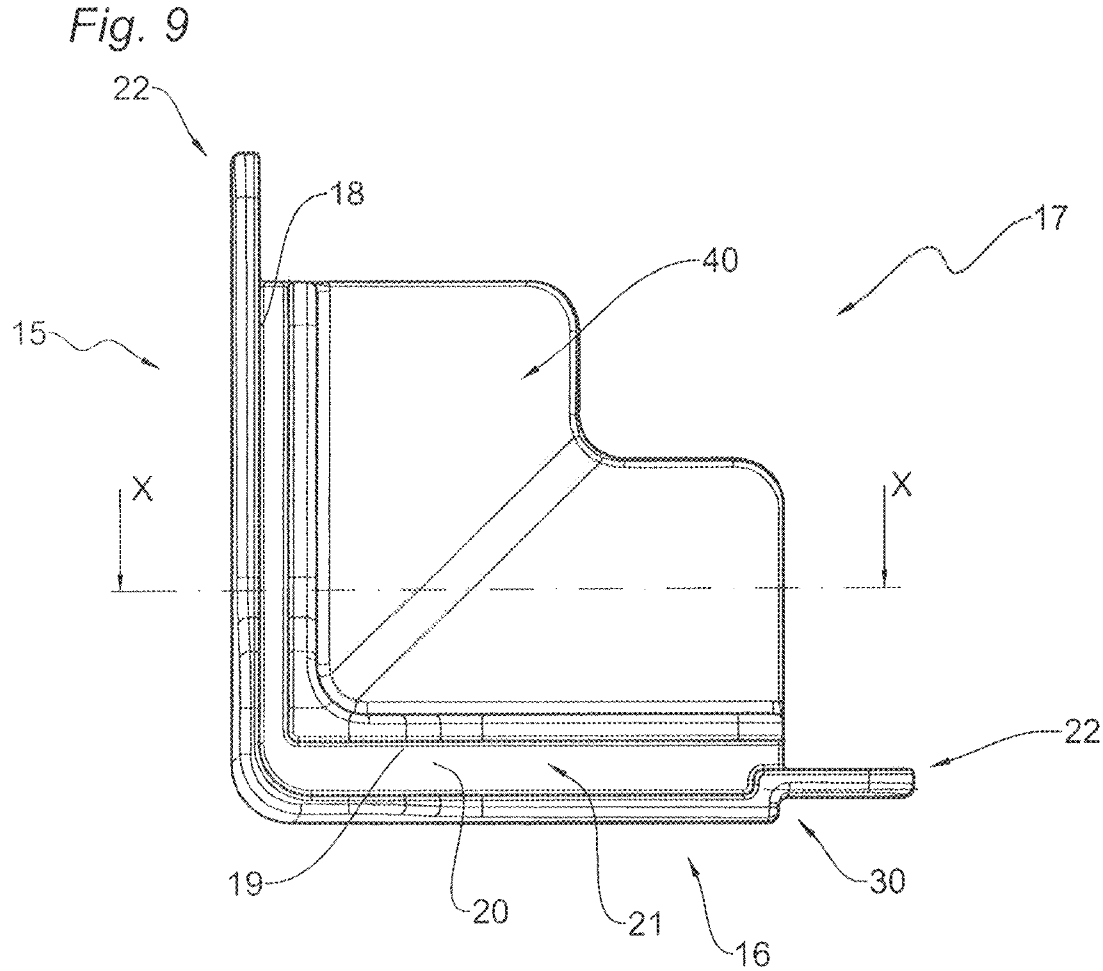
FIG. 9 is a view from below of the raised wall shown in FIG. 8.
Figure 10:
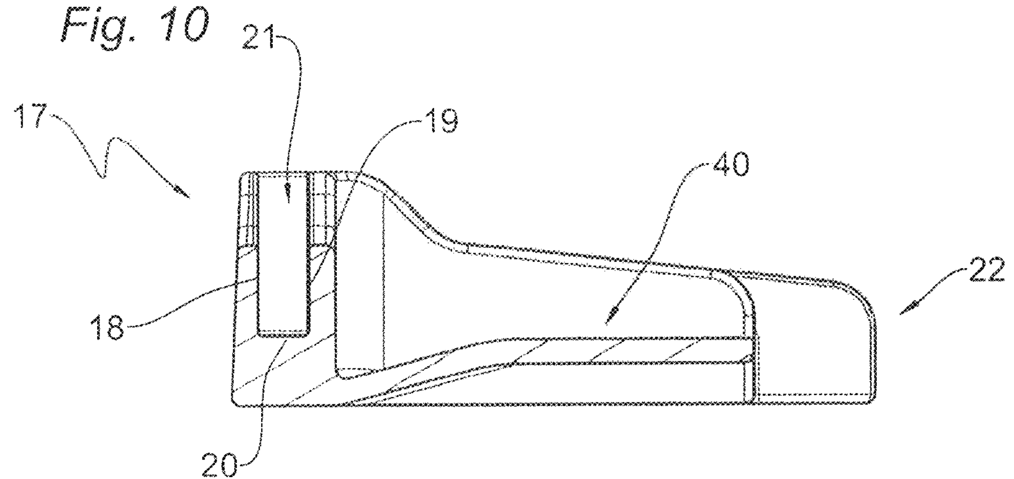
FIG. 10 is a cross-section along the line X-X of FIG. 9 of the raised wall.

As also shown in the embodiments of FIGS. 1 and 2, the longitudinal edges 9 advantageously act as flanges. More particularly, in addition to stiffening and rigidifying the plugging surface 8, the longitudinal edges 9 are provided with through-holes 10 for screw/bolt connections which serve to join a respective longitudinal edge 9 to an adjacent longitudinal edge 9 with overlap, respectively. Therefore, this configuration allows construction by superimposing a plurality of panels 7 of a continuous wall for extending the hopper base 2 as high as necessary to bring about the desired charging capacity in the hopper 1. It will be observed that the peripheral edge 5 at the apex of the hopper base 2 is preferably equal to the longitudinal edges 9 of the panels 7 so as to allow the connection thereof over the entire desired height of the wall (raised wall) with overlap.

The longitudinal edges 9 are interrupted at the ends 7*a*, 7*b*, bringing about in the angle junctions between panels 7 a gap zone which is generally designated 12. This gap zone 12 is closed according to the invention by applying a seal 13, 17 between the panels 7.

It may be observed that the ends 7*a*, 7*b* of the panels 7 are preferably formed, the first one 7*a* in the form of a substantially planar wing which is positioned in continuation of the corresponding plugging surface 8 but with a height which is slightly reduced with respect to the distance between the longitudinal edges 9 and the second one 7*b* with the same wing terminated by orthogonal folding at right angles relative to the longitudinal dimension with which this end is connected with overlap to the planar wing of the end 7*a*. The joint is preferably completed by connections 14, for example, of the screw/bolt type or the like.

The seal 13, 17 is preferably made from rubber or another molded plastic material and comprises two sides 15, 16 which are preferably at right angles relative to each other. It can be constructed as an end seal 17 between adjacent panels of the raised wall rings 6 which are superimposed or as an intermediate seal 13 between panels 7 which are both longitudinally adjacent and vertically superimposed.

The difference between the two is that the first one corresponds to the lower half of the second one, the second one preferably being a mirror image and symmetrical with respect to a center plane.

Having completed this introduction, there will be described in detail below only the intermediate seal 13, it being understood that the end seal 17 in practice constitutes the lower half of the seal described.

Advantageously, the end seal 17 may comprise a covering portion 40 which is able to at least partially cover a respective gap zone 12 of the raised wall ring 6 which is more remote with respect to the hopper base 2.

The seal 13 is applied as has been set out to the panels 7 in the gap zone 12 and comprises a first surface 18 which is intended to be in abutment against the plugging surface 8 at the exterior of the hopper 1, a second surface 19 which is intended to be in abutment against the plugging surface 8 from the interior of the hopper 1, a bridge 20 between the first and second surfaces 18, 19 delimiting a channel 21 between the same surfaces, in which the plugging surface 8 of adjacent panels 7 is received for covering and blocking the gap zone 12 generated by the interruption of the longitudinal edges 9.

The channel 21 extends in the seal 13 both in the upper half and in the lower half while it is provided in the seal 17 only in the lower portion, that is to say, the only portion present.

The external first surface 18 has a greater extent than the internal second surface 19 so as to overhang with respect to the projection thereof in the plane of the external surface and to overhang beyond the gap zone 12 which is determined by the interruption of the longitudinal edges 9.

At locations where the two wings of the ends 7*a*, 7*b* are superimposed, the channel 21 has a portion including a superimposition zone 31 in which the channel 21 has double the width with respect to the width of another portion of the channel 21. In this manner, the superimposition zone 31 can receive two superimposed plugging surfaces 8. In the other portion, however, the channel 21 has such a width as to be able to receive only one of the end surfaces. At the end of the superimposition zone 31, the first surface 18 forms an inflected course 30 so as to return adherent to the corresponding plugging surface 8 with a terminal portion 22 thereof which extends so as to cover from the exterior a small portion of the plugging surfaces 8 in which the longitudinal edge 9 is still present.

In order to construct hoppers 1 of various capacities, the hopper base 2 is taken as a basis by applying thereto the raised wall rings 6 necessary to achieve the desired volume of the hopper 1. The hopper 1 obtained in this manner can also be adapted in the future to any new needs simply by adding or removing one or more raised wall rings 6 as desired. At locations where one or more panels 7 could be damaged as a result of impacts, corrosion phenomena or the like, they may be readily replaced with integral new panels 7. It is further possible to construct basic hoppers 1 which require a small volume of storage and a smaller investment and financial expenditure and to separately construct raised wall rings 6 by which to adapt the basic hoppers 1 to the capacity required by the client without having to use special workpieces, adaptations or the like.

Although illustrated and described above with reference to certain specific embodiments, the present disclosure is nevertheless not intended to be limited to the details shown. Rather, various modifications may be made in the details within the scope and range of equivalents of the claims and without departing from the spirit of the disclosure.

The invention claimed is:

1. A raised wall for a hopper having an interior and an exterior, for a fertilizer spreading machines, the raised wall comprising:

at least one panel with at least a first end and a second end which are arranged for mutual connection to corresponding ends of at least one adjacent panel at a connection, there being defined in the at least one panel a plugging surface which is provided with longitudinal edges which are configured to be joined in a superimposed manner on an adjacent edge; and a seal which is provided to be applied between adjacent panels in the region of the connection, the seal having a first surface configured to abut the plugging surface from the exterior of the hopper, a second surface configured to abut the plugging surface from the interior of the hopper, and a bridge between the first surface and the second surface delimiting a channel between the surfaces, wherein the longitudinal edges are interrupted in the region of the connection where the panel is continued only by the plugging surface and the channel receives the plugging surface of at least one of the adjacent panels for covering and blocking a gap generated by the interruption of the longitudinal edges.

2. The raised wall according to claim 1, wherein the seal has an angular shape.

3. The raised wall according to claim 2, wherein the channel is shaped to receive four plugging surfaces of four corresponding adjacent panels, both longitudinally and in a superimposed state.

4. The raised wall according to claim 1, wherein the first surface has a greater extent than the second surface so as to overhang with respect to a projection thereof in a plane of the first surface and to overhang beyond the gap generated by the interruption of the longitudinal edges.

5. The raised wall according to claim 2, wherein the channel comprises a portion including a superimposition zone, in which the channel has double the width with respect to that of another portion of the channel in such a manner that the superimposition zone can receive two superimposed plugging surfaces and the other portion can receive a single one of the plugging surfaces.

6. The raised wall according to claim 5, wherein the first surface has an inflected course in the region of an end of the superimposition zone.

7. The raised wall according to claim 1, wherein the seal is made from plastic material.

8. The raised wall according to claim 6, wherein the first surface of the seal in the region of the inflected course is shaped so as to return in a manner tight against the corresponding plugging surface with a terminal portion thereof which extends so as to cover from the exterior a portion of the plugging surfaces, in which the edge is still present.

9. A hopper including a hopper base on which at least one raised wall ring which is constructed with raised walls according to claim 1 is superimposed.

10. The raised wall according to claim 3, wherein the channel comprises a portion including a superimposition zone in which the channel has double the width with respect to that of another portion of the channel in such a manner that the superimposition zone can receive two superimposed plugging surfaces and the other portion can receive a single one of the plugging surfaces.

11. The raised wall according to claim 4, wherein the channel comprises a portion including a superimposition zone in which the channel has double the width with respect to that of another portion of the channel in such a manner that the superimposition zone can receive two superimposed plugging surfaces and the other portion can receive a single one of the plugging surfaces.

12. The raised wall according to claim 10, wherein the first surface has an inflected course in the region of an end of the superimposition zone.

13. The raised wall according to claim 11, wherein the first surface has an inflected course in the region of an end of the superimposition zone.

14. The raised wall according to claim 12, wherein the first surface of the seal in the region of the inflected course is shaped so as to return in a manner tight against the corresponding plugging surface with a terminal portion thereof which extends so as to cover from the exterior a portion of the plugging surfaces, in which the edge is still present.

15. The raised wall according to claim 13, wherein the first surface of the seal in the region of the inflected course is shaped so as to return in a manner tight against the corresponding plugging surface with a terminal portion thereof which extends so as to cover from the exterior a portion of the plugging surfaces, in which the edge is still present.

16. A hopper comprising an interior, an exterior, a base, and at least one raised wall ring superimposed on the base and constructed with raised walls, each raised wall including:

at least one panel with at least a first end and a second end which are arranged for mutual connection to corresponding ends of at least one adjacent panel at a connection, there being defined in the at least one panel a plugging surface which is provided with longitudinal edges which are configured to be joined in a superimposed manner on an adjacent edge; and a seal which is provided to be applied between adjacent panels in the region of the connection, the seal having a first surface configured to abut the plugging surface from the exterior of the hopper, a second surface configured to abut the plugging surface from the interior of the hopper, and a bridge between the first surface and the second surface delimiting a channel between the surfaces, wherein the longitudinal edges are interrupted in the region of the connection where the panel is continued only by the plugging surface and the channel receives the plugging surface of at least one of the adjacent panels for covering and blocking a gap generated by the interruption of the longitudinal edges, wherein the first surface has a greater extent than the second surface so as to overhang with respect to a projection thereof in a plane of the first surface and to overhang beyond the gap generated by the interruption of the longitudinal edges, wherein the channel comprises a portion including a superimposition zone in which the channel has double the width with respect to that of another portion of the channel in such a manner that the superimposition zone can receive two superimposed plugging surfaces and the other portion can receive a single one of the plugging surfaces, wherein the first surface has an inflected course in the region of an end of the superimposition zone, and wherein the first surface of the seal in the region of the inflected course is shaped so as to return in a manner tight against the corresponding plugging surface with a terminal portion thereof which extends so as to cover from the exterior a portion of the plugging surfaces, in which the edge is still present.

17. The hopper according to claim 16, wherein the seal has an angular shape.

18. The hopper according to claim 17, wherein the channel is shaped to receive four plugging surfaces of four corresponding adjacent panels, both longitudinally and in a superimposed state.

19. The hopper according to claim 16, wherein the seal is made from plastic material.

20. A hopper comprising an interior, an exterior, a base, and at least one raised wall ring superimposed on the base and constructed with raised walls, each raised wall including:

at least one panel with at least a first end and a second end which are arranged for mutual connection to corresponding ends of at least one adjacent panel at a connection, there being defined in the at least one panel a plugging surface which is provided with longitudinal edges which are configured to be joined in a superimposed manner on an adjacent edge; and a seal which has an angular shape, is made from plastic material, and is provided to be applied between adjacent panels in the region of the connection, the seal having a first surface configured to abut the plugging surface from the exterior of the hopper, a second surface configured to abut the plugging surface from the interior of the hopper, and a bridge between the first surface and the second surface delimiting a channel between the surfaces, wherein the longitudinal edges are interrupted in the region of the connection where the panel is continued only by the plugging surface and the channel receives the plugging surface of at least one of the adjacent panels for covering and blocking a gap generated by the interruption of the longitudinal edges, wherein the first surface has a greater extent than the second surface so as to overhang with respect to a projection thereof in a plane of the first surface and to overhang beyond the gap generated by the interruption of the longitudinal edges, wherein the channel comprises a portion including a superimposition zone in which the channel has double the width with respect to that of another portion of the channel in such a manner that the superimposition zone can receive two superimposed plugging surfaces and the other portion can receive a single one of the plugging surfaces, wherein the first surface has an inflected course in the region of an end of the superimposition zone, wherein the first surface of the seal in the region of the inflected course is shaped so as to return in a manner tight against the corresponding plugging surface with a terminal portion thereof which extends so as to cover from the exterior a portion of the plugging surfaces, in which the edge is still present, and wherein the channel is shaped to receive four plugging surfaces of four corresponding adjacent panels, both longitudinally and in a superimposed state.

* * * * *